US012688509B2

(12) United States Patent
Solanki et al.

(10) Patent No.: US 12,688,509 B2
(45) Date of Patent: Jul. 21, 2026

(54) SYSTEM AND METHOD RELATING TO PLANNING EVENT FOR A NETWORK

(71) Applicant: Rakuten Mobile, Inc., Tokyo (JP)

(72) Inventors: Preetam Solanki, Madhya Pradesh (IN); Jaya Bhatnagar, Madhya Pradesh (IN); Ayush Agrawal, Madhya Pradesh (IN); Alok Pawar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 840 days.

(21) Appl. No.: 17/905,065

(22) PCT Filed: Jun. 22, 2022

(86) PCT No.: PCT/US2022/034435
§ 371 (c)(1),
(2) Date: Aug. 26, 2022

(87) PCT Pub. No.: WO2023/249618
PCT Pub. Date: Dec. 28, 2023

(65) Prior Publication Data
US 2023/0419330 A1 Dec. 28, 2023

(51) Int. Cl.
*G06Q 30/016* (2023.01)
*G06Q 10/10* (2023.01)

(52) U.S. Cl.
CPC ......... *G06Q 30/016* (2013.01); *G06Q 10/103* (2013.01)

(58) Field of Classification Search
CPC ........................... G06Q 30/016; G06Q 10/103
See application file for complete search history.

(56) References Cited

U.S. PATENT DOCUMENTS 6,937,993 B1 * 8/2005 Gabbita ................. G06Q 10/10
707/999.001
7,716,077 B1 * 5/2010 Mikurak ............ G06Q 10/0631
705/7.12
(Continued)

FOREIGN PATENT DOCUMENTS

WO 2020237343 A1 12/2020

OTHER PUBLICATIONS

Bratu, Vlad-Ioan, and Claes Beckman. "Base station antenna tilt for load balancing." 2013 7th European Conference on Antennas and Propagation (EuCAP). IEEE, 2013. (Year: 2013).*

*Primary Examiner* — Corey Russ
(74) *Attorney, Agent, or Firm* — HAUPTMAN HAM, LLP

(57) ABSTRACT

A system and method for creating/initiating a planned event protocol in a configuration manager to implement a parameter change on a network element within a telecommunication network. The planned event protocol is created by a user providing information in a plurality of data fields. Some of these data fields include a network element identifier and a parameter identifier, and the actual network element is updated by updating the parameter which is commanded by an entity management system in communication with the configuration manager. The planned event protocol is reviewed to ensure the information entered into the planned event protocol is correct. The planned event protocol is implemented on a network element(s) resulting in a parameter change of the physical network element within a domain, such that the parameter change impacts user devices, and the service/coverage the user device is able to receive in the domain.

20 Claims, 10 Drawing Sheets

(56) References Cited

U.S. PATENT DOCUMENTS

| | | | | |
|---|---|---|---|---|
| 2001/0029504 A1* | 10/2001 | O'Kane, Jr. | ........... | G06Q 10/06 |
| 2003/0187865 A1* | 10/2003 | Frisina | ............. | G05B 19/41865 |
| | | | | 707/999.102 |
| 2004/0024862 A1 | 2/2004 | Wall et al. | | |
| 2004/0260668 A1 | 12/2004 | Bradford | | |
| 2008/0027826 A1* | 1/2008 | Popick | ............... | G06Q 30/0633 |
| | | | | 705/26.8 |
| 2011/0044178 A1* | 2/2011 | Oinonen | ............... | H04L 41/145 |
| | | | | 455/446 |
| 2011/0092195 A1* | 4/2011 | Hussein | ................ | H04W 24/02 |
| | | | | 455/418 |
| 2011/0130137 A1* | 6/2011 | Sanders | ................ | H01Q 1/246 |
| | | | | 455/446 |
| 2012/0173688 A1* | 7/2012 | True | ....................... | G06Q 10/20 |
| | | | | 709/223 |
| 2013/0273934 A1* | 10/2013 | Meredith | .............. | H04W 16/04 |
| | | | | 455/456.1 |
| 2013/0297060 A1* | 11/2013 | Sundling, Jr. | ...... | G06Q 10/0631 |
| | | | | 700/100 |
| 2016/0127943 A1* | 5/2016 | Shaw | ................ | H04W 28/0231 |
| | | | | 370/230 |
| 2021/0319549 A1 | 10/2021 | Bhatnagar | | |
| 2022/0416415 A1* | 12/2022 | Holmes | ................ | H01Q 1/1228 |
| 2023/0246676 A1* | 8/2023 | Reeves | ................ | H04W 24/02 |
| | | | | 375/262 |
| 2023/0409307 A1* | 12/2023 | Johnston | ................. | H04L 67/34 |

* cited by examiner

| Status | WorkOrder ID | Domain | Vendor | Technology | Priority | Risk | Impact | Schedule Start Date | Schedule End Date | Created On | Requested By |
|---|---|---|---|---|---|---|---|---|---|---|---|
| Expired | ******* | RAN | ******* | LTE | Normal | - | NSA | 29 Dec, 2021 | 30 Dec, 2021 | 29 Dec, 2021 | |
| Expired | ******* | RAN | ******* | LTE | Normal | - | NSA | 29 Dec, 2021 | 30 Dec, 2021 | 29 Dec, 2021 | |
| Expired | ******* | RAN | ******* | LTE | Normal | - | NSA | 29 Dec, 2021 | 30 Dec, 2021 | 29 Dec, 2021 | |
| Expired | ******* | RAN | ******* | LTE | Normal | - | NSA | 29 Dec, 2021 | 30 Dec, 2021 | 29 Dec, 2021 | |
| Expired | ******* | RAN | ******* | LTE | Normal | - | NSA | 29 Dec, 2021 | 30 Dec, 2021 | 29 Dec, 2021 | |
| Completed | ******* | RAN | ******* | LTE | Normal | - | NSA | 29 Dec, 2021 | 30 Dec, 2021 | 29 Dec, 2021 | |
| Completed | ******* | RAN | ******* | LTE | Normal | - | NSA | 29 Dec, 2021 | 29 Dec, 2021 | 29 Dec, 2021 | |
| Completed | ******* | RAN | ******* | LTE | Normal | - | NSA | 29 Dec, 2021 | 29 Dec, 2021 | 29 Dec, 2021 | |
| Completed | ******* | RAN | ******* | LTE | Normal | - | NSA | 29 Dec, 2021 | 29 Dec, 2021 | 29 Dec, 2021 | |
| Completed | ******* | RAN | ******* | LTE | Normal | - | NSA | 29 Dec, 2021 | 29 Dec, 2021 | 29 Dec, 2021 | |
| Expired | ******* | RAN | ******* | LTE | Normal | - | NSA | 28 Dec, 2021 | 29 Dec, 2021 | 28 Dec, 2021 | |
| Expired | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | Normal | - | NSA | 28 Dec, 2021 | 29 Dec, 2021 | 28 Dec, 2021 | |
| Completed | ******* | RAN | ******* | LTE | High | - | NSA | 28 Dec, 2021 | 28 Dec, 2021 | 28 Dec, 2021 | |
| Completed | ******* | RAN | ******* | LTE | Normal | - | NSA | 28 Dec, 2021 | 28 Dec, 2021 | 28 Dec, 2021 | |

Figure 8:
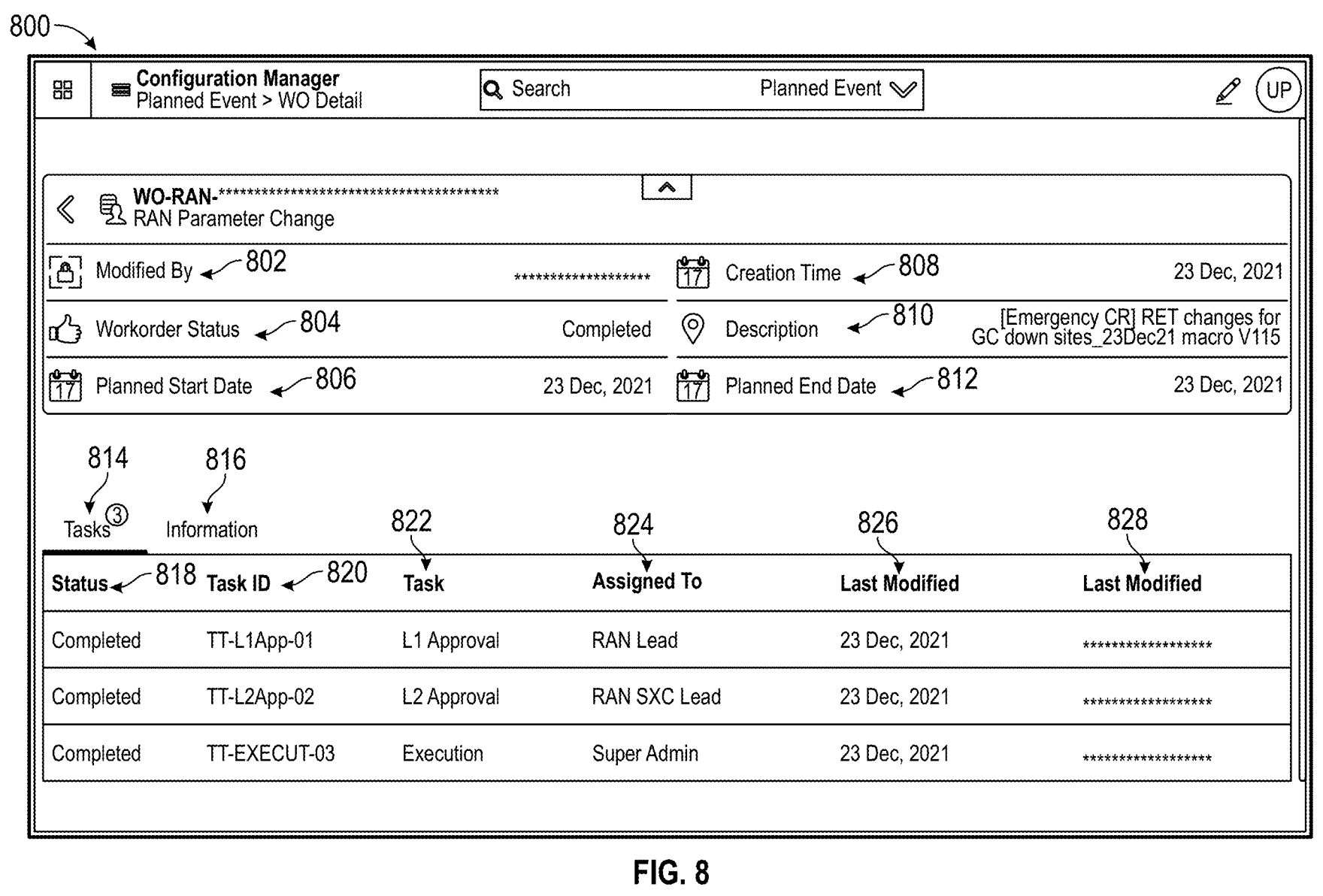

| Configuration Manager | | | | Q Search | | Planned Event ≫ | ✎ | ⊕UP |
|---|---|---|---|---|---|---|---|---|
| Planned Event > WO Detail | | | | | | | | |

WO-RAN-***************
RAN Parameter Change

| Modified By ∕802 | ************** | | Creation Time ∕808 | 23 Dec, 2021 |
|---|---|---|---|---|
| Workorder Status ∕804 | Completed | | Description ∕810 | [Emergency CR] RET changes for GC down sites_23Dec21 macro V115 |
| Planned Start Date ∕806 | 23 Dec, 2021 | | Planned End Date ∕812 | 23 Dec, 2021 |

814  816
  ↘    ↘
③  Information
Tasks

| Status ∕ | 818 Task ID ∕820 | 822 Task | 824 Assigned To | 826 Last Modified | 828 Last Modified |
|---|---|---|---|---|---|
| Completed | TT-L1App-01 | L1 Approval | RAN Lead | 23 Dec, 2021 | *************** |
| Completed | TT-L2App-02 | L2 Approval | RAN SXC Lead | 23 Dec, 2021 | *************** |
| Completed | TT-EXECUT-03 | Execution | Super Admin | 23 Dec, 2021 | *************** |

800

900 —

Configuration Manager
Planned Event > WO Detail

Search          Planned Event »

Tasks ③   Information

Domain
RAN

Vendor
*******************

Technology
LTE

Software Version
*******************

Priority
High

Impact
NSA

Type of Change
Minor

Trail Start Time
,

Trail End Time
,

Displaying 4 of 4
902

| Execution Status | NE Name (904) | Equipment Type (906) | PLD (908) | Planned Value (910) | Parameter Name (912) | Identifiers (914) | Output (916) |
|---|---|---|---|---|---|---|---|
| Success | ******************* | MACRO_CELL | ********** | 4.00 | ********* | redGroupId=4&anten... | Change done success... |
| Success | ******************* | MACRO_CELL | ********** | 4.00 | ********* | redGroupId=8&anten... | Change done success... |
| Success | ******************* | MACRO_CELL | ********** | 4.00 | ********* | redGroupId=3&anten... | Change done success... |
| Success | ******************* | MACRO_CELL | ********** | 3.00 | ********* | redGroupId=1&anten... | Change done success... |

FIG. 9

SYSTEM AND METHOD RELATING TO PLANNING EVENT FOR A NETWORK

RELATED APPLICATIONS

The present application is a National Phase of International Application No. PCT/US2022/034435, filed Jun. 22, 2022.

BACKGROUND

In a telecommunication network, a network element within a domain, e.g., Radio Access Network (RAN), often undergoes regularly scheduled maintenance so coverage is able to be provided to user devices within the network. Maintenance is able to be performed by changing a parameter or setting in the network element. A domain comprises numerous network elements, and thus changing a parameter on each network element is a time intensive, manual process. There is also a risk of human error to occur since network elements are often maintained by a field technician who performs maintenance at the actual location of the network element compared to maintenance of network elements being automated on a large scale as described below. Additionally, when maintaining numerous network elements, there is also a risk of creating a conflict, such as changing/updating the wrong parameter on the wrong network element. A planned event protocol, however, is able to automate this process of changing/updating a parameter on multiple network elements, and allows these changes/updates to be performed in a scheduled manner to reduce a risk of conflicts or avoid conflicts.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a view of a GUI of a landing page for planned event work orders view in accordance with some embodiments.

FIG. 8 is a view of a GUI of a work order detail in a task menu view in accordance with some embodiments.

FIG. 9 is a view of a GUI of a work order detail in an information menu view in accordance with some embodiments.

DETAILED DESCRIPTION

Figure 1:
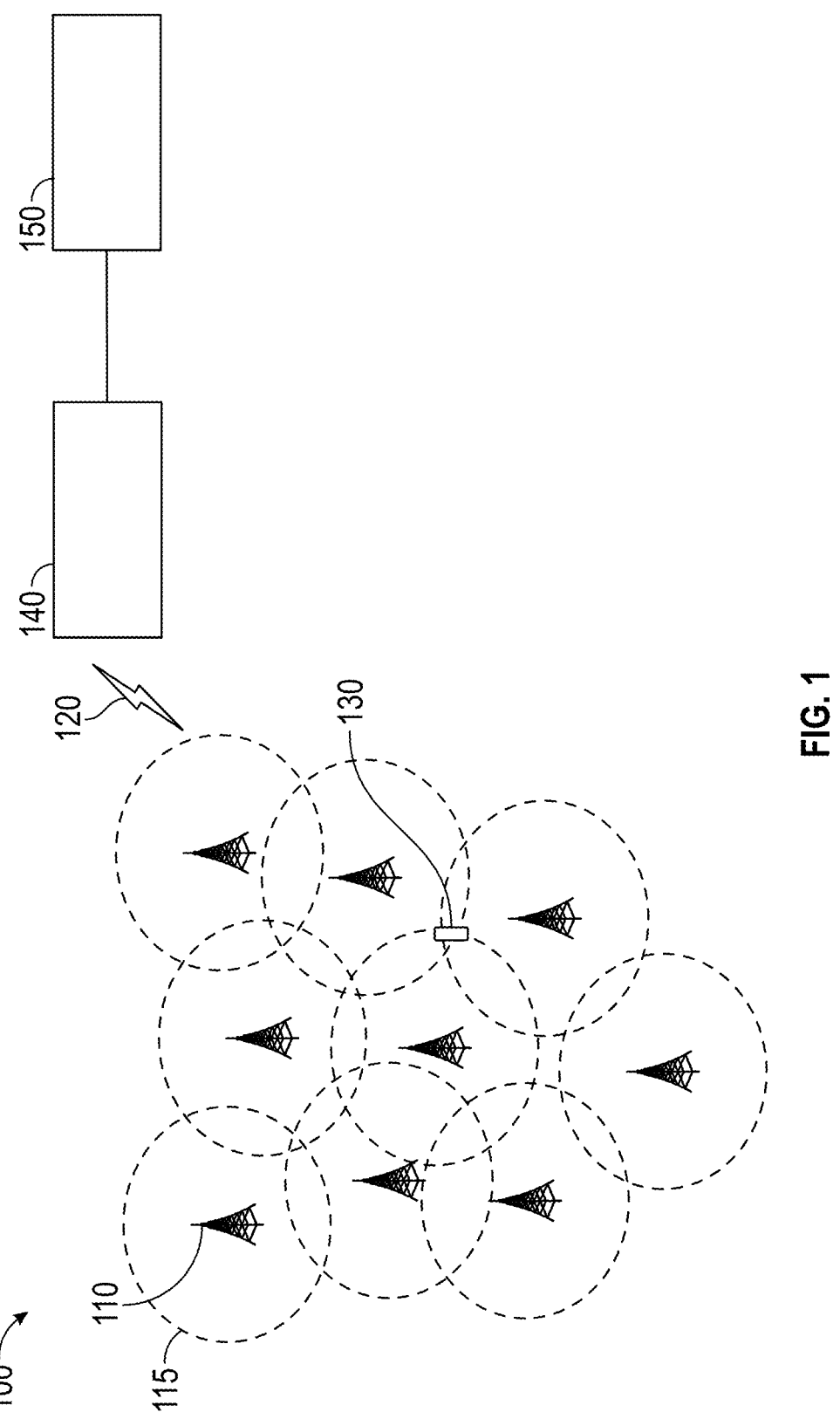
FIG. 1 is a view of a telecommunication network in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Telecommunication networks, as well as other multiple component systems, include a domain, such as radio access network ("RAN") or other type of domain. For a user device, such as a cell phone, smart phone, laptop, or other, to be able to connect to the domain then numerous network elements, such as base stations, which include one or more radio transceivers, e.g., macrocells, microcells, or other suitable components, act as the connection point. The base stations are in place over geographic land areas called cells. These network elements have numerous settings, or parameters, and these parameters often experience an update or change to another parameter so as to be able to improve coverage to the many user devices, such as mobile phones, lap tops, tablets, gaming systems, or other which connect to these network elements for service coverage. When a network element is selected to experience a change, a field technician would go out to the physical network element and make the parameter change manually. Considering how many network elements there are within a cell, having a technician travel from one network element to another is inefficient and a waste of resources, and also presents opportunity for human error to occur, as noted above.

In an effort to improve efficiency and reduce the risk of human error, and potential conflicts, the present disclosure describes a system and method for creating and initiating a planned event protocol, referring to inputting into a protocol all the event information used to implement a parameter change on a network element; having the planned event protocol reviewed and authorized; and having the planned event protocol implemented on the network element having a real world impact.

FIG. 1 is a diagram of a telecommunication network 100 in accordance with some embodiments. The telecommunication network 100 includes a plurality of network elements 110, e.g., base stations, and each network element 110 has a corresponding coverage area 115. In some instances, coverage areas 115 for neighboring network elements 110 overlap one another to define an overlapping coverage area. In some instances, a gap exists between coverage areas 115 of neighboring network elements 110. A user device 130 within the telecommunication network 100 is able to connect to one or more network elements 110 when the user device 130 is within the coverage area 115 corresponding to the network element 110. In some embodiments, a user device 130 includes a cellular phone, a smart phone, a session initiation protocol (SIP) phone, a laptop, a desktop, a smart watch, a personal digital assistant (PDA), a satellite radio, a global positioning system, a multimedia device, a video device, a digital audio player (e.g., MP3 player), a camera, a game console, a tablet, a smart device, or a wearable communication device.

In some embodiments, the hardware of telecommunication network 100 includes a server, base stations (as shown), radio units, or any other suitable hardware in a network system, and the software of telecommunication network 100 includes a plurality of applications performing telecommunication functions, managing the telecommunication performance, and/or any other suitable software in a telecommunication network 100.

A connection 120 is used to implement the parameter change on the network element 110 as commanded by an entity management system 140. In some embodiments, the entity management system 140 is configured to automate the parameter change on a network element 110 so that the appropriate procedure is applied to implement the parameter change on network element 110 in the telecommunication network 100.

In some embodiments, the connection 120 is a wireless connection. In some embodiments, the connection 120 is a wired connection. Using the connection 120, the entity manage system 140 is able to implement the planned event protocol on the network elements 110 as the parameter change. In some embodiments, the entity management system 140 is a virtual control unit that initiates the information inputted in graphic user interfaces ("GUIs"), such as GUIs 300, 400, or 500, which details the planned event protocol, as a command on the network element 110. The information inputted into the GUIs is able to be selected from a configuration manager, such as configuration manager 150 of FIG. 1. The configuration manager has the information for creating and initiating the planned event protocol stored in database 1018 of memory 1012 of system 1000 in FIG. 10.

The configuration manager 150 is configured to generate the planned event protocol that is to be implemented by the entity management system 140 on the network element 110 of the telecommunication network 100. In some embodiments, the configuration manager 150 describes the network element in which the parameter change will occur. In some embodiments, the configuration manager 150 identifies the location where the planned event will occur. In some embodiments, the configuration manager 150 describes and provides a network location of a particular network element on which the parameter change will occur. In some embodiments, the configuration manager 150 describes a geographical location of the network element 110. In some embodiments, the configuration manager 150 identifies a vendor that provides services related to the planned event protocol. In some embodiments, the configuration manager 150 identifies a category of the parameter for the planned event protocol.

The configuration manager 150 stores the planned event protocol in database 1018 of system 1000, and generates a work order based on the planned event protocol, which is implemented by entity management system 140. The work order describes the planned event protocol, and the schedule for when the planned event protocol is to be implemented, and assigns the work order to personnel or a group responsible for reviewing and authorizing the planned event protocol. In some embodiments, the configuration manager 150 automatically transmits the work order to the responsible personnel or group.

The entity management system 140 is usable to implement the parameter change on network element 110, for example, to help maintain or improve service/coverage provided by the telecommunication network 100. A parameter that improves service coverage is, for example, related to the angular tilt of an antenna on network element 110, and allows the coverage area 115 to provide service/coverage to more devices depending on how the angular tilt is adjusted.

Figure 2:
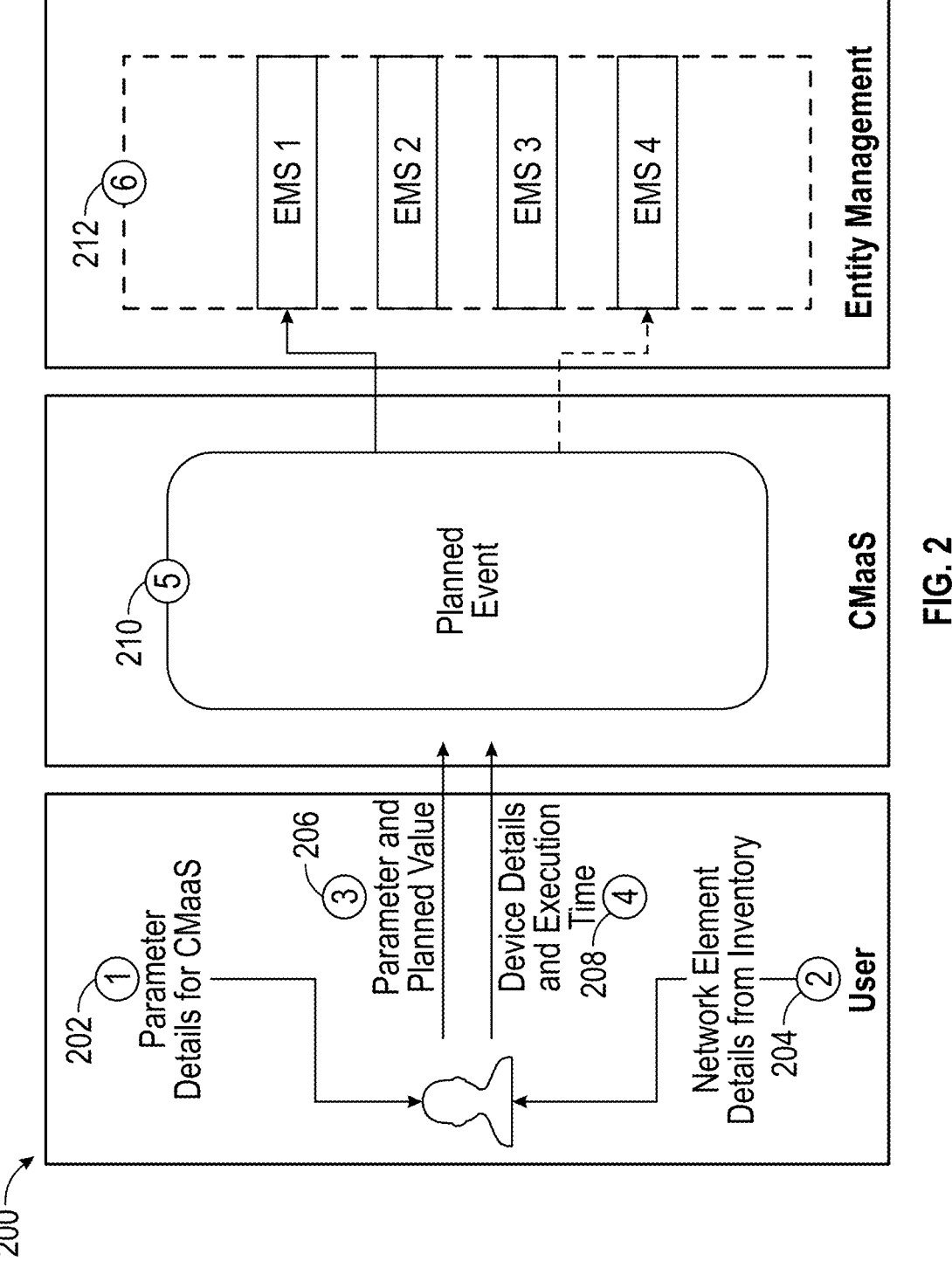
FIG. 2 is an operational flow chart of initiating/creating a planned event, submitting the planned event for review and authorization, and executing/implementing the planned event in accordance with some embodiments.

FIG. 2 is an operational flow chart of a method 200 of initiating/creating a planned event, submitting the planned event, and executing the planned event in accordance with some embodiments. In some embodiments, the method 200 is at least partially implemented using a graphical user interface (GUI), e.g., a GUI 300 (FIG. 3), a GUI 400 (FIG. 4), a GUI 500 (FIG. 5), or other suitable GUI. The planned event protocol is stored in database 1018, and capable of being displayed on a GUI.

The method 200 allows the user to initiate the planned event protocol. In operation 202, a user is able to create the planned event protocol by providing general information for a parameter to be implemented, in a configuration manager 150. The configuration manager is configured to implement instructions 1014 through the processor 1004 and generate a GUI output 1002. In some embodiments, the GUI output 1002 is presented directly through a display device (not shown) of the configuration manager. In some embodiments, a user is a technician for a vendor/service provider. In some embodiments, a user is a technician for a manufacturer of the network element. In some embodiments, a user is a technician for a manufacturer of a component of the network element. In some embodiments, a user is able to create the planned event protocol using a stock template of the configuration manager stored in database 1018 of memory 1012 of system 1000 in FIG. 10. In some embodiments, a user is able to create the planned event protocol by creating a custom template using the configuration manager, or other compatible application. In some embodiments, the configuration manager is a server. In some embodiments, the configuration manager 150 is configured to generate other protocols besides the planned event protocol. In some embodiments, the configuration manager is a dedicated computer device that is configured to only generate the planned event protocol.

In operation 204, in further creating the planned event protocol, a user is able to provide information about a network element on which the parameter will be implemented, including an identifier for the network element. As discussed above, a domain is able to have numerous network elements. Due to a domain having numerous network elements, an identifier distinguishes each network element. Rather than know all of the identifiers of the numerous network elements, a user is able to search for a network element, or a plurality of network elements by searching an inventory stored in database 1018 of memory 1012 of system 1000 in FIG. 10 using user interface 1016.

In operation 206, in further creating the planned event protocol, on the basis of the event details provided in operation 202 and the network element selected in operation 204, a user is able to select a parameter to be implemented on the selected network element. Numerous parameters are able to be changed on a network element. Rather than know all of the individual parameters, a user is able to search categories of parameters, and select an individual parameter within a category. The categories of parameters and the parameters which a user is able to select from are populated by a parameter inventory stored in database 1018 of memory 1012 of system 1000 in FIG. 10 using user interface 1016. Depending on the parameter selected, a user is able to further configure a parameter by selecting a value for the parameter.

In operation 208, a user is able to submit the information entered in operations 202, 204, and 206 into the configuration manager which outputs/creates an execution statement. In some embodiments, the execution statement is a work order. The execution statement has a scheduled time set in operation 202 by a user, and at the scheduled time the planned event protocol is to be initiated by the configuration manager. The configuration manager is in communication with an entity management system, and on the basis of the execution statement, the entity management system commands the change of parameter on the physical network element.

In operation 210, the configuration manager 150 is in communication with an entity management system 140, and on the basis of the execution statement, the entity management system commands the change of parameter on the actual network element. In some embodiments, a single entity management system commands the parameter change on the network element. In some embodiments, multiple entity management systems command the parameter change on the network element.

Figure 3:
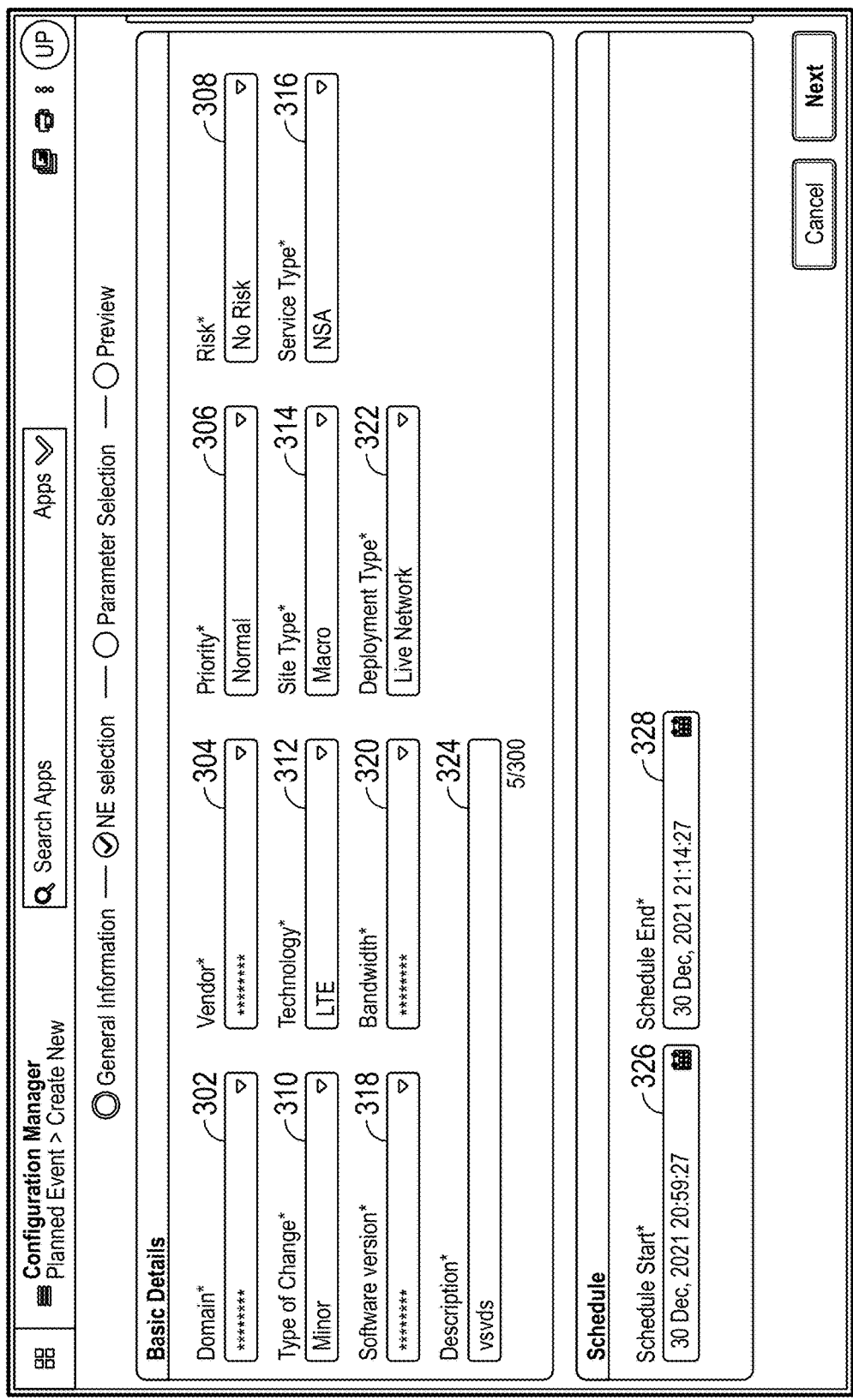
FIG. 3 is a view of a graphical user interface (GUI) of a general information view in accordance with some embodiments.

FIG. 3 is a view of a graphical user interface (GUI) of a General Information view 300 in accordance with some embodiments. The General Information view 300 is divided into a Basic Details sub-view and a Schedule sub-view where a user is able to enter event detail information into fillable data fields. In the Basic Details sub-view, a user is able to select/enter the following information. In the Domain 302 data field, a user is able to select a domain on which a parameter will be changed for a network element 110. For example, a Radio Access Network ("RAN") domain is able to be selected. In some embodiments, other components of a telecommunication network are able to be selected, such as the core, baseband units, radios, data centers or transport units. In the Vendor 304 data field, a user is able to select a carrier or service provider. In the Priority 306 data field, a user is able to assign a priority or importance, to the planned event protocol. For example, a planned event is able to have a high priority, intermediate priority, or normal priority. In the Risk 308 data field, a user is able to select whether the planned event protocol is associated with a risk level. For example, if the planned event affects the performance of a network element 110 then "Risk" is able to be selected from the dropdown menu. In the Type of Change 310 data field, a user is able to select how a parameter change will affect the service/coverage of a network element 110 for a user device, a minor change or a major change. For example, a minor change occurs when adjusting the tilt of an antenna would not cause a user device to lose service/coverage in a site, and a major change occurs when the tilt of an antenna would cause a user device to lose service/coverage in a site. In the Technology 312 data field, a user is able to select the wireless broadband communication for the planned event, for example, Long-Term Evolution ("LTE"), 5G, 4G, or other. In the Site Type 314 data field, a user is able to select the radio coverage served by a particular cell site. For example, a Macro site type is a high power cell type to provide a larger coverage area for a telecommunication network compared to a Micro site type. In some embodiments, site type includes an indoor small cell, an outdoor small cell, or other. In the Service Type 316 data field, a user is able to select whether the parameter being implemented is of a Service Affecting ("SA") type or a Non-service Affecting ("NSA") type. A SA-type affects the service/coverage of a user device, and a NSA-type does not affect the service/coverage of a user device. In the Software Version 318 data field, a user is able to select the software version of a network element/site within a domain. For example, ten network elements/sites within a domain are on software version 10, and another ten within the domain are on software version 12. If a parameter is being changed on a network element which affects a user device running a particular software version, then the particular software version is able to be selected from the dropdown menu in this data field; the list of software versions to be selected from the dropdown menu are auto populated. In the Bandwidth 320 data field, a user is able to select a bandwidth value. In some embodiments, a bandwidth of 5 Megahertz ("MHz"), 20 MHz, or other is able to be selected. In the Deployment Type 322 data field, a user is able to select whether a site within a network is a live site. A production deployment type or trial deployment type is selectable from an auto populated dropdown menu. When production deployment type is selected a parameter is able to be changed to another parameter and implemented for a site within a live network. When production deployment type is selected then a Trial Duration is not able to be selected, as in FIG. 3, i.e., the planned event protocol would be live when implemented. When trial deployment type is selected then a parameter is able to be tested for planning purposes, i.e., a planned event protocol would undergo testing to determine the parameter's effect on a network element's service/coverage. When trial deployment type is selected then a Trial Duration is able to be selected (not shown), and a duration of the event which is to be initiated is able to be inputted, and the duration is able to be inputted as day, date, year. In the Description 324 data field, a user is able to enter alpha-numeric characters into a blank data field to describe the planned event protocol which is to be initiated by the configuration manager. Under the Schedule sub-view, a user is able to enter a period of time during which the planned event protocol will be implemented by the entity management system, by selecting a day, date, year, and time in the Schedule Start 326 data field and the Schedule End 328 data field. During the period of time between the Schedule Start 326 and the Schedule End 328 the planned event protocol is able to be implemented on a network element.

Figure 4:
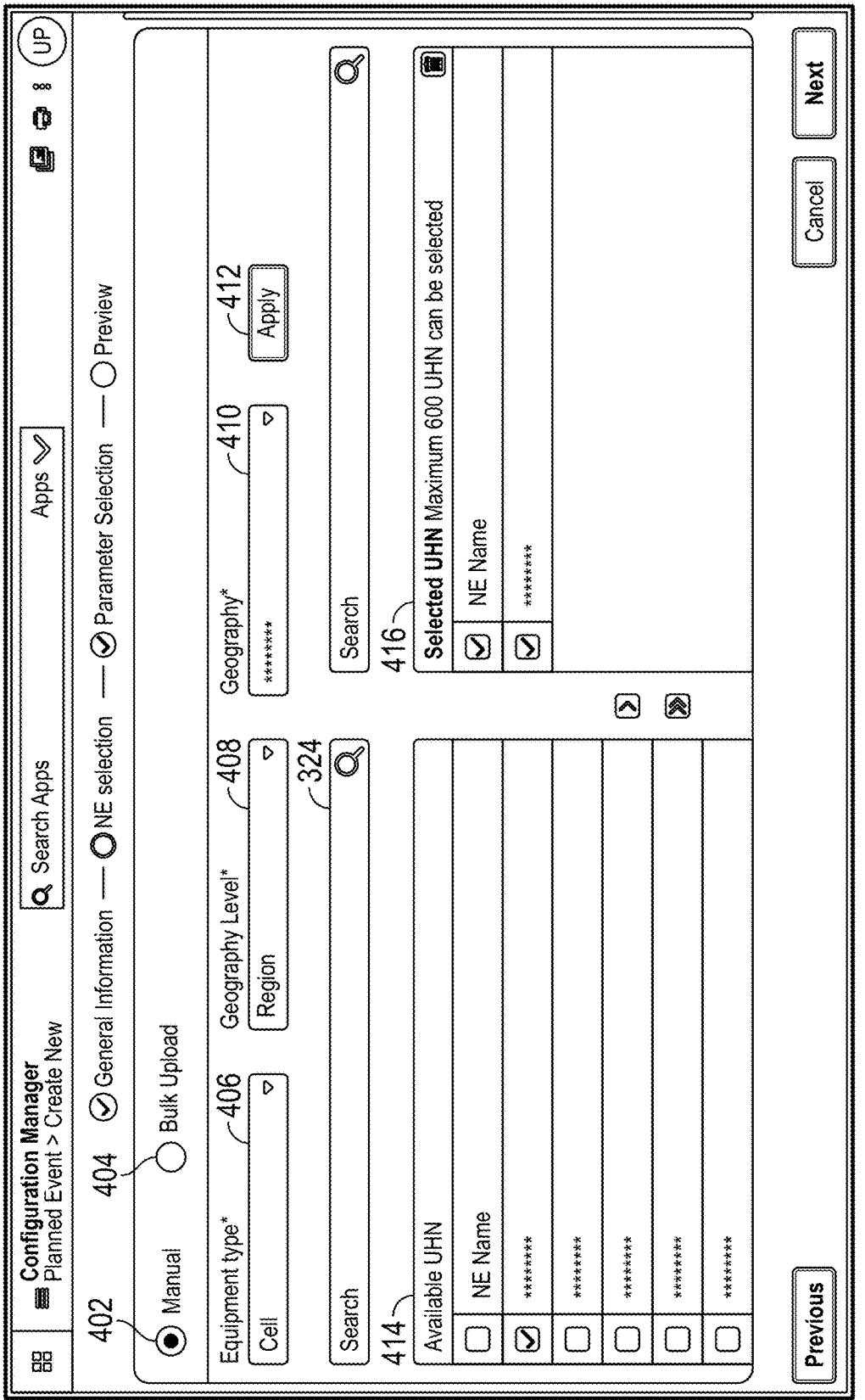
FIG. 4 is a view of a GUI of a network element selection view in accordance with some embodiments.

FIG. 4 is a view of a GUI of a network element selection view 400 in accordance with some embodiments. In the Equipment Type 406 data field, a user is able to select the specific type of network element equipment available within a network for the domain. For example, a user is able to select the following network element equipment types from the dropdown menu: Cell, virtual Distributed Unit ("vDU"), virtual Central Unit ("VCU"), Radio Interference Unit ("RIU"), or other in the domain. In some embodiments, if a user selects a different domain, then the network element equipment available for selection in the dropdown menu is different since different domains support different network element equipment. In the Geography Level 408 data field, a user is able to select from a dropdown menu a geography level. For example, a user is able to select a Region, Prefecture, City, RF cluster, or other. In the Geography 410 data field, depending on the geography level selected from the Geography Level 408 data field, a user is able to select a specific geographic location for the network element to receive a parameter change for the planned event. For example, if a user selects Region from the dropdown menu of the Geography Level 408 data field, then the user is able to select the specific geographic location, for example, the Kanto region of Japan. For example, if a user selects Prefecture from the dropdown menu of the Geography Level 408 data field, then the user is able to select Tokyo, Chiba, or other prefecture as the specific geographic location from the dropdown menu of the Geography 410 data field. In the Apply 412 graphic element, in response to the selections entered in the Equipment Type 406 data field, the Geography Level 408 data field, and the Geography 410 data field an inventory of available named network elements under the Available UHN 414 data field, is generated by the configuration manager. A user is able to select a named network element on which to execute a parameter change provided by the database 1018 stored in memory 1012 of the configuration manager. A user is able to select the named network element manually or individually if the Manual 402 data field is selected, or by a bulk upload file if the Bulk Upload 404 data field is selected. If the Bulk Upload 404 data field is selected then all the network element name(s), parameter name(s), and parameter value(s) are able to be uploaded into a data file, for example, a XML file. The network element name(s) selected from the Available UHN 414 data field appear in the Selected UHN 416 data field.

Figure 5:
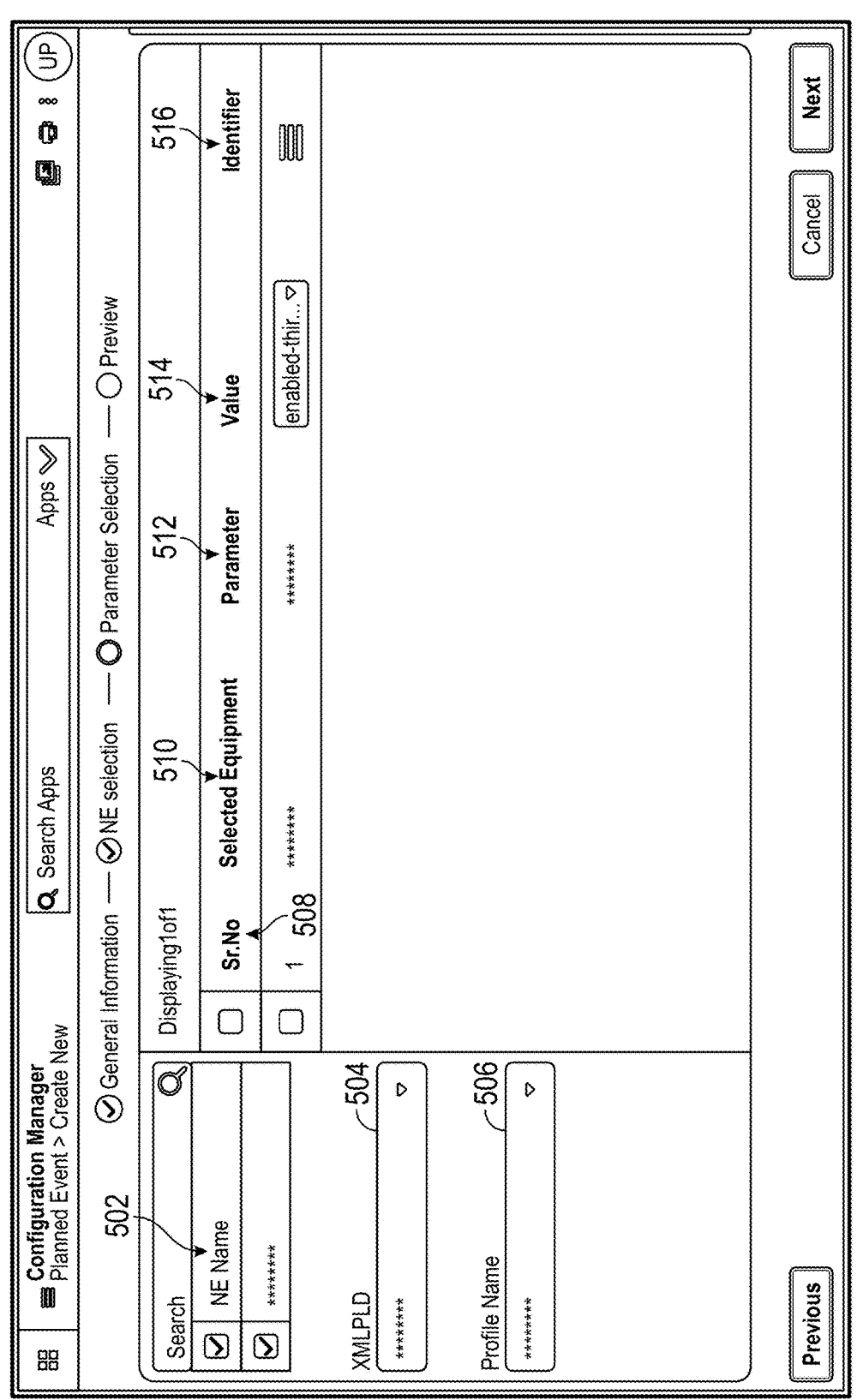
FIG. 5 is a view of a GUI of a parameter selection view in accordance with some embodiments.

FIG. 5 is a view of a GUI of a parameter selection view 500 in accordance with some embodiments. In the NE Name 502 data field, the network element selected from the Available UHN 414 data field is listed. In the XMLPLD 504 data field, a user is able to select from a dropdown menu the broader category of parameter to be changed on the network element selected from the dropdown menu of the NE Name 502 data field. In the Profile Name 506 data field, on the basis of the category of parameter selected from the XMLPLD 504 data field, a user is able to select a parameter from a dropdown menu of parameter inventory provided by the database 1018 stored memory 1012 of the configuration manager. A user is able to select a single parameter or multiple parameters from the Profile Name 506 data field.

In the Sr. No. 508 data field, a list number is assigned to the parameter selection. In the Selected Equipment 510 data field, the selected network element is listed. In the Value 512 data field, there are numerous parameters from which a value is able to be selected, including but not limited to NB Cell Identity was selected as a parameter having a range of 1-268435455, a value of 71504642, Electrical Tilt able to have a value selectable from a range of −16 to +16, TAC able to have a value selectable from a range of 0-405, DRX Cycle able to have a value selectable from a range of ms10 to ms120, and UE Timer T310 able to have a value selectable from a range of tim1000 to tim3000. In the Identif 514 data field, a user us able to select an identifier from the drop down menu. The user is able to select an exact path of the parameter. For Example, if the user wants to change a parameter at Cell number 0, but at Cell number 0 there is some other identifier called Profile Id then in that case, a user is able to select Cell Number=0&ProfileId=1 from the drop down menu, i.e., the user is able to view the exact path of the selected parameter.

After a parameter is selected, a user is able to drag and drop the parameter to the Parameter 508 data field. For example, a user is able to select the MLB parameter from the Profile Name 516 data field and drag and drop the MLB parameter to the Parameter 508 data field. In another example, a user is able to select the NB Cell Identity parameter from the Profile Name 516 data field and drag and drop the NB Cell Identity parameter to the Parameter 508 data field. Once a user drops the selected parameter in the Parameter 508 data field, then a user is able to see the range of the particular parameter, if available, and select a value under the Value 510 data field from the range.

Figure 6:
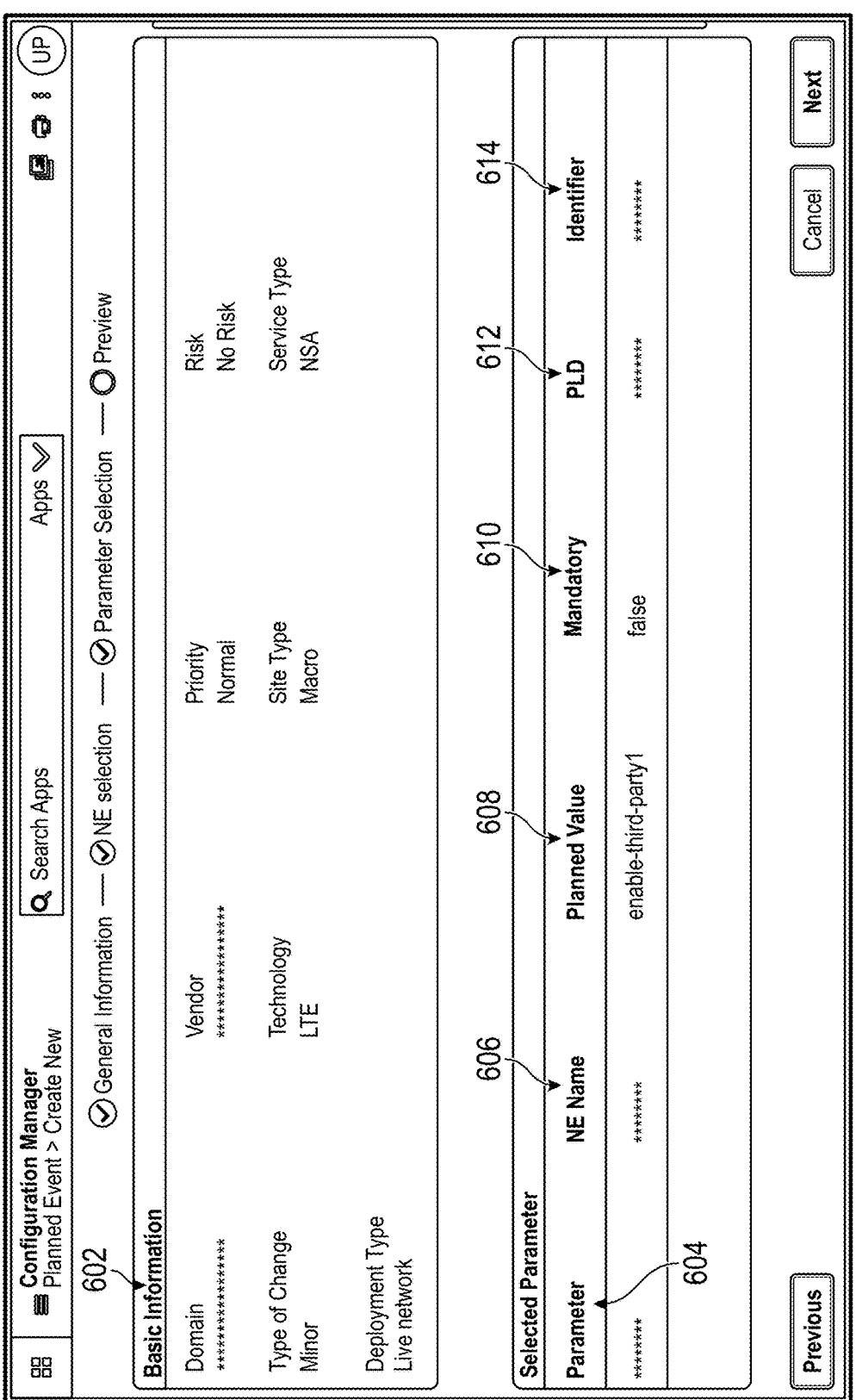
FIG. 6 is a view of a GUI of a preview view of the information selected for the data fields in FIG. 3, FIG. 4, and FIG. 5 in accordance with some embodiments.

FIG. 6 is a view of a GUI of a preview view 600 in accordance with some embodiments. In the Basic Information 602 data field, a user is able to view the data selections from the General Information view 300. In the Parameter 604 data field, a user is able to view the parameter selection from the Parameter Selection view 500. In the NE Name 606 data field, a user is able to view the selected network element from the parameter selection view 500. In the Planned Value 608 data field, a user is able to view the value (not range) selection from the parameter selection view 500. In the Mandatory 610 data field, a user is able to select "true" or "false" from a drop down menu, which indicates whether the parameter being implemented on the network element is mandatory for the function of the network element, "true" indicating the parameter is necessary for proper function of the network element, and "false" indicating the parameter is not necessary for proper function of the network element. In the PLD 612 data field, a user is able to view the parameter category selected from the dropdown menu of the NE Name 502 data field. In the Identifier 614 data field, as there are multiple network elements of the same name, a user is able to identify which particular sector within the RAN has the network element which is to receive the parameter update.

FIG. 7 is a view of a GUI of a landing page view of work orders for planned event protocols 700 in accordance with some embodiments. In the Status 702 data field, a user is able to determine the status of a work order. For example, a work order that is newly created has a "New" status. Other statuses for work orders include "In Progress", "Completed", and "Expired". In the Work Order ID 704 data field, a user is able to select a particular work order to open, and complete if needed. In the Domain 706 data field, a user is able to view the domain selected in the General Information view 300 on which the associated planned event protocol will be implemented. In the Vendor 708 data field, a user is able to view the network/carrier selected in the General Information view 300 on which the associated planned event protocol will be implemented. In Technology 710, a user is able to determine which type of equipment for which the particular work order will be implemented. In Priority 712, a user is able to determine the priority or importance of a particular work order. For example, a work order is able to have a normal priority, intermediate priority, or high priority. In Risk 714, a user is able to determine whether the event is associated with a risk of the associated planned event protocol. In the Impact 716 data field, a user is able to view the Service Affecting ("SA") or Non-service Affecting ("NSA") parameter of the associated planned event protocol selected in the General Information view 300. In the Schedule Start Date 718 data field, a user is able to view the date on which the parameter change of the associated planned event protocol will start. In the Schedule End Date 720, a user is able to view the date by which the parameter change of the associated planned event protocol will end. In the Created On 722 data field, a user is able to view the date on which a particular work order of the associated planned event protocol was created. In the Requested By 724 data field, a user is able to view the individual who requested the planned event protocol be created/initiated.

FIG. 8 is a view of a GUI of a work order detail of a Tasks view 800 that will be reviewed by a reviewer in accordance with some embodiments. In the Modified By 802 data field, a user is able to view the last individual who modified the work order. In the Work order Status 804 data field, a user is able to view whether or not the work order has been completed. In the Planned Start Date 806 data field, a user is able to view the start of the time period scheduled for the planned event to be implemented. In the Creation Time 808 data field, a user is able to view the date on which the planned event was created. In the Description 810 data field, a user is able to view a summary of the planned event. In the Planned End Date 812 data field, a user is able to view the end of the time period for the planned event to be implemented. In the Tasks 814 sub-view, a user is able to view data fields 818-828. In the Information 816 sub-view, a user is able to view GUI 900 and data fields 902-916 further discussed below. In the Status 818 data field, a user is able to view whether the task associated with the work order has been reviewed by a reviewer or executed. When a reviewer has completed the review of the work order, the status indicates "Completed". When the task is for execution of the work order, and the task has been executed, the status also indicates "Completed". In the Task ID 820 data field, a user is able to view a separate task identification for the levels of review and the execution status of the associated work order. A work order for a planned event protocol undergoes two levels of review. The first level of review is performed by a domain lead, such as a RAN lead, the second level of review is performed by a domain SXC Lead, such as a RAN SXC Lead, and the execution of the work order is completed by an Administrator. A user is able to view the category of reviewer in the Assigned To 824 data field. In the Task 822 data field, a user is able to view a specific task for the work order, for example, a first tasking being Level 1 Approval and a second task being Level 2 Approval. In the Last Modified 726 data field, a user is able to view when the task was last updated. In the Last Modifier 828 data field, a user is able to view the name of the individual who performed the last update on a task.

FIG. 9 is a view of a GUI of a work order detail of an Information view 900 in accordance with some embodiments. In the Execution Status 902 data field, a user is able to view whether or not the parameter change has been implement/executed on the associated network element. If the parameter change has been implemented/executed on the associated network, then the status will indicate success, and if not, then the status will indicate failed. In the NE Name 904 data field, a user is able to view the name of the network element on which the parameter change has occurred. In the Equipment Type 906 data field, a user is able to view the type of network element equipment on which the parameter change has occurred, for example, MACRO_CELL, i.e., a macrocell antenna. In some embodiments, the type of network element equipment is a microcell or femtocell. In the PLD 908 data field, a user is able to view the category of the parameter. In the Planned Value 910 data field, a user is able to view the planned value of the parameter. In the Parameter Name 912 data field, a user is able to view the particular parameter of the category of parameter. In the Identifiers 914 data field, as there are multiple network elements of the same name, a user is able to identify which particular sector within the RAN has the network element which is to receive the parameter update. In the Output 916 data field, a user is able to view whether the planned event protocol was successfully implemented by the entity management system. If the planned event protocol was not successfully implemented, i.e., failed, then a reason as to why the failure occurred will be viewable.

Figure 10:
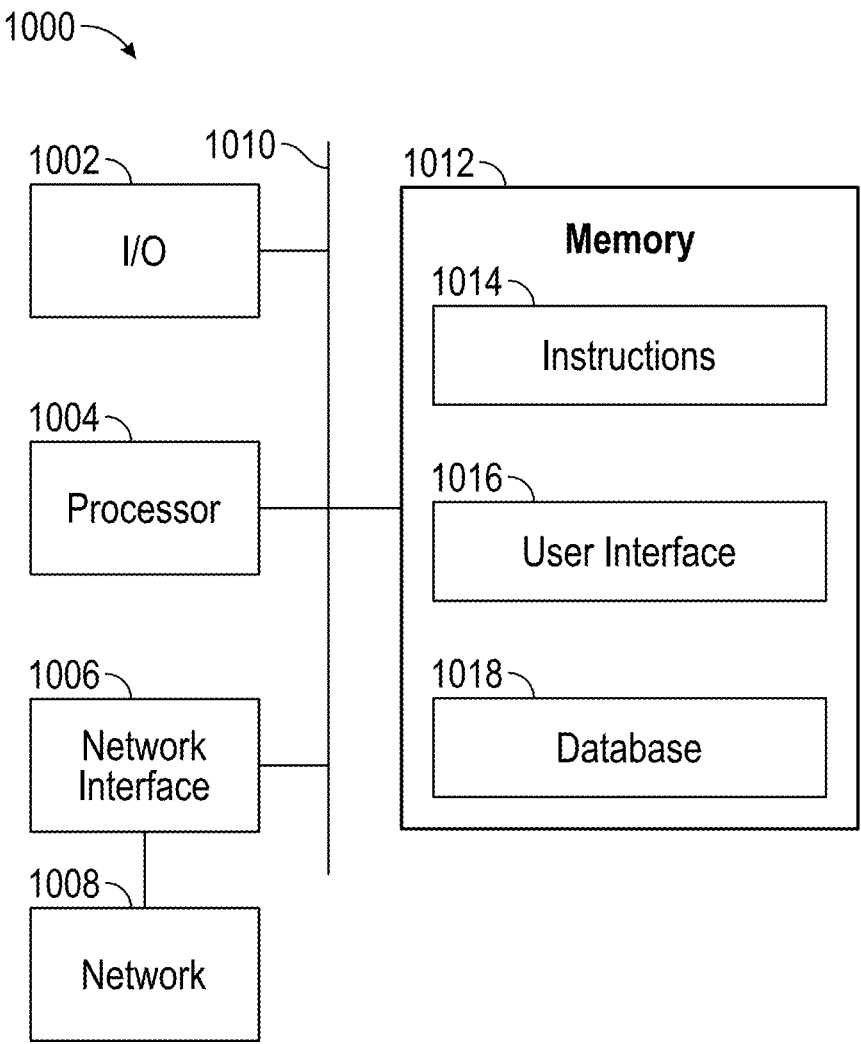
FIG. 10 is a functional block diagram of a computer or processor-based system upon which or by which some embodiments are implemented.

FIG. 10 is a functional block diagram of a computer or processor-based system 1000 upon which or by which an embodiment is implemented. System 1000 includes a hardware processor 1004 and a non-transitory, computer readable storage medium 1012 encoded with, i.e., storing, the computer program code 1014, i.e., a set of executable instructions. Computer readable storage medium 1012 is also encoded with instructions 1014 for interfacing with processors. The processor 1004 is electrically coupled to the computer readable storage medium 1012 via a bus 1010. The processor 1004 is also electrically coupled to an I/O interface 1002 by bus 1010. A network interface 1006 is also electrically connected to the processor 1004 via bus 1010. Network interface 1006 is connected to a network 1008, so that processor 1004 and computer readable storage medium 1012 are capable of connecting to external elements via network 1008. The processor 1004 is configured to execute the computer program code 1014 encoded in the computer readable storage medium 1012 in order to cause system 1000 to be usable for performing a portion or all of the operations as described in method 200 or described with respect to FIGS. 1-9.

In some embodiments, the processor 1004 is a central processing unit (CPU), a multi-processor, a distributed processing system, an application specific integrated circuit (ASIC), and/or a suitable processing unit.

In some embodiments, the computer readable storage medium 1012 is an electronic, magnetic, optical, electromagnetic, infrared, and/or a semiconductor system (or apparatus or device). For example, the computer readable storage medium 1012 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1012 includes a compact disk-read only memory (CD-ROM), a compact disk-read/write (CD-R/W), and/or a digital video disc (DVD). In some embodiments, the computer readable storage medium 904 is part of a cloud storage system.

In some embodiments, the storage medium 1012 stores the computer program code 1014 configured to cause system 100 to perform method 200 or the processes described with respect to FIGS. 1-9. In some embodiments, the storage medium 904 also stores information needed for performing a method 100 or the processes described with respect to FIGS. 1-9 as well as information generated during performing the method 200 or the processes described with respect to FIGS. 1-9.

In some embodiments, the storage medium 1012 stores instructions 1014 for interfacing with external devices. The instructions 1014 enable processor 1004 to generate images for display to the users of the system 1000.

System 1000 includes I/O interface 1002. I/O interface 1002 is coupled to external circuitry. In some embodiments, I/O interface 1002 includes a keyboard, keypad, mouse, trackball, trackpad, touch-screen and/or cursor direction keys for communicating information and commands to processor 1004.

System 1000 also includes network interface 1006 coupled to the processor 1004. Network interface 1006 allows system 1000 to communicate with network 1008, to which one or more other computer systems are connected. Network interface 1006 includes wireless network interfaces such as BLUETOOTH, WIFI, WIMAX, GPRS, or WCDMA; or wired network interface such as ETHERNET, USB, or IEEE-1394. In some embodiments, method 200 or the processes described with respect to FIGS. 1-9 is implemented in two or more systems 1000, and information is exchanged between different systems 1000 via network 1008.

A method of managing an event protocol in a configuration manager, includes receiving event detail information for the event protocol using a graphic user interface (GUI), wherein the GUI includes a plurality of fields, and at least one of the plurality of fields indicates a scheduled time for the event protocol to occur. The method also includes selecting a network element identifier mapped to a network element component in a telecommunication network from the GUI, and selecting a parameter identifier mapped to a parameter in the network element component from the GUI. The method also includes generating, in response to submission of the event in the GUI, a work order based on the event. The method also includes submitting, at the scheduled time, the work order into the configuration manager, wherein the configuration manager is in communication with an entity management system, and the entity management system is configured to implement the parameter in the network element component. In the method of managing the event on the telecommunication network, the submitting of the work order is in response to sending the work order to a reviewer for an approval, and awaiting for the approval of the work order. In the method of managing the event on the telecommunication network, the sending of the work order to the reviewer for approval comprises sending the work order to a first reviewer for a first approval, and in response to receiving the first approval, sending the work order to a second reviewer for a second approval. In the method of managing the event on the telecommunication network, at least one of the plurality of fields indicates a domain in the telecommunication network. In the method of managing the event on the telecommunication network, at least one of the plurality of fields indicates a vendor that services the computer network. In the method of managing the event on the telecommunication network, at least one of the plurality of fields indicates a priority level for the event. In the method of managing the event on the telecommunication network, the network element comprises an equipment type and a geography level for the telecommunication network. In the method of managing the event on the telecommunication network, the parameter comprises a value for the parameter based on the selected equipment type for the network element.

A computer device of managing an event protocol in a configuration manager, includes a non-transitory computer readable medium configured to store computer executable instructions, and at least one processor, wherein in response to executing the computer executable instructions, the processor is configured to perform the following. The processor is configured to receive event detail information for the event protocol using a graphic user interface (GUI), wherein the GUI includes a plurality of fields, and at least one of the plurality of fields indicates a scheduled time for the event protocol to occur. The processor is configured to select a network element identifier mapped to a network element component in a telecommunication network from the GUI. The processor is configured to select a parameter identifier mapped to a parameter in the network element component from the GUI. The processor is configured to generate, in response to submission of the event in the GUI, a work order based on the event. The processor is configured to send the work order to a reviewer for an approval, and await for the approval of the work order. The processor is configured to submit, at the scheduled time, the work order into the configuration manager, wherein the configuration manager is in communication with an entity management system, and the entity management system is configured to implement the parameter in the network element component. In the computer device of managing the event on the telecommunication network, at least one of the plurality of fields indicates a domain in the computer network. In the computer device of managing the event on the telecommunication network, at least one of the plurality of fields indicates a vendor that services the computer network. In the computer device of managing the event on the telecommunication network, at least one of the plurality of fields indicates a priority level for the event. In the computer device of managing the event on the telecommunication network, the selecting of the network element comprises selecting an equipment type and a geography level for the computer network. The computer device of managing the event on the telecommunication network, the selecting of the parameter comprises selecting a value for the parameter based on the selected equipment type for the network element.

A non-transitory computer readable medium is configured to store computer executable instructions to manage an event protocol in a configuration manager, and in response to executing the computer executable instructions, a processor is configured to do the following. The processor is configured to receive event detail information for the event protocol using a graphic user interface (GUI), and the GUI includes a plurality of fields, and at least one of the plurality of fields indicates a scheduled time for the event protocol to occur. The processor is configured to select a network element identifier mapped to a network element component in a telecommunication network from the GUI. The processor is configured to select a parameter identifier mapped to a parameter in the network element component from the GUI. The processor is configured to generate, in response to submission of the event in the GUI, a work order based on the event. The processor is configured to send the work order to a reviewer for an approval, and await for the approval of the work order. The processor is configured to submit, at the scheduled time, the work order into the configuration manager, and the configuration manager is in communication with an entity management system, and the entity management system is configured to implement the parameter in the network element component. In the non-transitory computer readable medium, at least one of the plurality of fields indicates a domain in the telecommunication network. In the non-transitory computer readable medium, at least one of the plurality of fields indicates a vendor that services the telecommunication network. In the non-transitory computer readable medium of raising the event on the telecommunication network, at least one the plurality of fields indicates a priority level for the event. In the non-transitory computer readable medium, the selecting of the network element comprises selecting an equipment type and a geography level for the telecommunication network. In the non-transitory computer readable medium, the selecting of the parameter comprises selecting a value for the parameter based on the selected equipment type for the network element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of managing an event protocol in a configuration manager, comprising:

receiving event detail information for the event protocol using a graphic user interface (GUI), wherein the GUI includes a plurality of fields, and at least one of the plurality of fields indicates a scheduled start time and a scheduled end time for the event protocol to occur as defined by a schedule start field and a schedule end field in the GUI;

selecting a network element identifier mapped to a network element component in a telecommunication network from the GUI, wherein the network element component is an antenna;

selecting a parameter identifier mapped to a parameter in the network element component from the GUI, wherein the parameter is an angular tilt of the antenna;

generating, in response to submission of the event in the GUI, a work order based on the event; and submitting, during a time window bounded by the scheduled start time and the scheduled end time, the work order into the configuration manager, wherein the configuration manager is in communication with an entity management system, and the entity management system is configured to automatically verify the validity of the planned value of the angular tilt based on a preset parameter value range corresponding to the antenna, and adjust the angular tilt of the antenna in the telecommunication network during the time window only if the planned value is within the preset parameter value range.

2. The method of managing the event on the telecommunication network according to claim 1, wherein the submitting of the work order is in response to sending the work order to a reviewer for an approval, and awaiting for the approval of the work order.

3. The method of managing the event on the telecommunication network according to claim 2, wherein the sending of the work order to the reviewer for approval comprises sending the work order to a first reviewer for a first approval, and in response to receiving the first approval, sending the work order to a second reviewer for a second approval.

4. The method of managing the event on the telecommunication network according to claim 1, wherein at least one of the plurality of fields indicates a domain in the telecommunication network.

5. The method of managing the event on the telecommunication network according to claim 1, wherein at least one of the plurality of fields indicates a vendor that services the computer network.

6. The method of managing the event on the telecommunication network according to claim 1, wherein at least one of the plurality of fields indicates a priority level for the event.

7. The method of managing the event on the telecommunication network according to claim 1, wherein the network element comprises an equipment type and a geography level for the telecommunication network.

8. The method of managing the event on the telecommunication network according to claim 7, wherein the parameter comprises a value for the parameter based on the selected equipment type for the network element.

9. A computer device of managing an event protocol in a configuration manager, comprising:

a non-transitory computer readable medium configured to store computer executable instructions;

at least one processor, wherein in response to executing the computer executable instructions, the processor is configured to:

receive event detail information for the event protocol using a graphic user interface (GUI), wherein the GUI includes a plurality of fields, and at least one of the plurality of fields indicates a scheduled start time and a scheduled end time for the event protocol to occur as defined by a schedule start field and schedule end field in the GUI;

select a network element identifier mapped to a network element component in a telecommunication network from the GUI, wherein the network element component is an antenna;

select a parameter identifier mapped to a parameter in the network element component from the GUI, wherein the parameter is an angular tilt of the antenna;

generate, in response to submission of the event in the GUI, a work order based on the event;

send the work order to a reviewer for an approval, and await for the approval of the work order;

submit, during a time window bounded by the scheduled start time and the scheduled end time, the work order into the configuration manager, wherein the configuration manager is in communication with an entity management system, and the entity management system is configured to automatically verify the validity of the planned value of the angular tilt based on a preset parameter value range corresponding to the antenna, and adjust the angular tilt of the antenna in the telecommunication network during the time window only if the planned value is within the preset parameter value range.

10. The computer device of managing the event on the telecommunication network according to claim 9, wherein at least one of the plurality of fields indicates a domain in the computer network.

11. The computer device of managing the event on the telecommunication network according to claim 9, wherein at least one of the plurality of fields indicates a vendor that services the computer network.

12. The computer device of managing the event on the telecommunication network according to claim 9, wherein at least one of the plurality of fields indicates a priority level for the event.

13. The computer device of managing the event on the telecommunication network according to claim 9, wherein the selecting of the network element comprises selecting an equipment type and a geography level for the computer network.

14. The computer device of managing the event on the telecommunication network according to claim 13, wherein the selecting of the parameter comprises selecting a value for the parameter based on the selected equipment type for the network element.

15. A non-transitory computer readable medium configured to store computer executable instructions to manage an event protocol in a configuration manager, wherein in response to executing the computer executable instructions, a processor is configured to:

receive event detail information for the event protocol using a graphic user interface (GUI), wherein the GUI includes a plurality of fields, and at least one of the plurality of fields indicates a scheduled start time and a scheduled end time for the event protocol to occur as defined by a schedule start field and a schedule end field in the GUI;

select a network element identifier mapped to a network element component in a telecommunication network from the GUI, wherein the network element component is an antenna;

select a parameter identifier mapped to a parameter in the network element component from the GUI, wherein the parameter is an angular tilt of the antenna;

generate, in response to submission of the event in the GUI, a work order based on the event;

send the work order to a reviewer for an approval, and await for the approval of the work order; and submit, during a time window bounded by the scheduled start time and the scheduled end time, the work order into the configuration manager, wherein the configuration manager is in communication with an entity management system, and the entity management system is configured to automatically verify the validity of the planned value of the angular tilt based on a preset parameter value range corresponding to the antenna, and adjust the angular tilt of the antenna in the telecommunication network during the time window only if the planned value is within the preset parameter value range.

16. The non-transitory computer readable medium of claim 15, wherein at least one of the plurality of fields indicates a domain in the telecommunication network.

17. The non-transitory computer readable medium of claim 15, wherein at least one of the plurality of fields indicates a vendor that services the telecommunication network.

18. The non-transitory computer readable medium of managing the event on the telecommunication network according to claim 15, wherein at least one the plurality of fields indicates a priority level for the event.

19. The non-transitory computer readable medium of claim 15, wherein the selecting of the network element comprises selecting an equipment type and a geography level for the telecommunication network.

20. The non-transitory computer readable medium of claim 19, wherein the selecting of the parameter comprises selecting a value for the parameter based on the selected equipment type for the network element.

* * * * *